T. MAY.
WELL DRILLING MECHANISM.
APPLICATION FILED MAR. 23, 1916.
1,188,001.
Patented June 20, 1916.
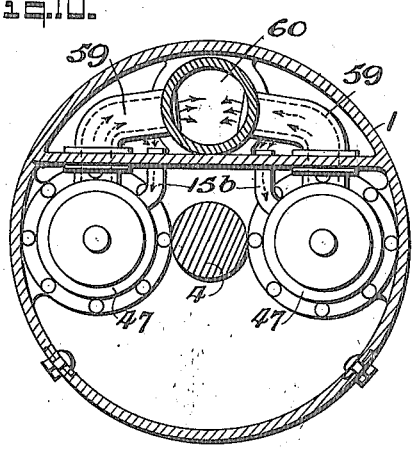
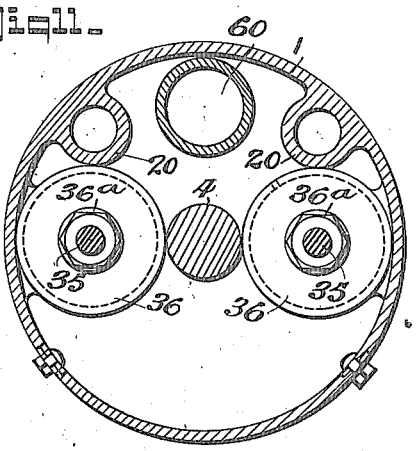
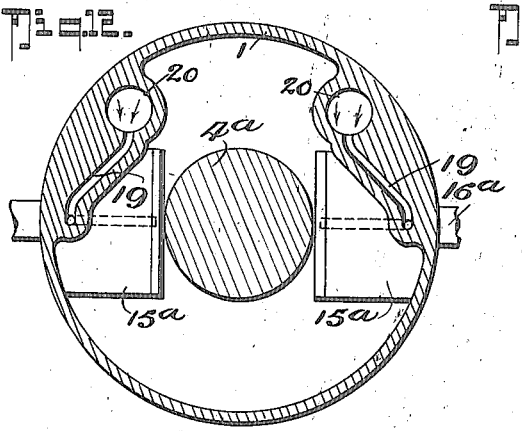
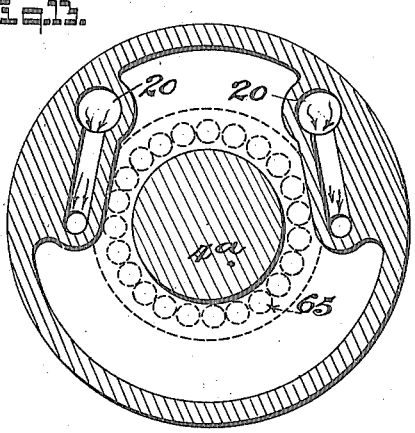
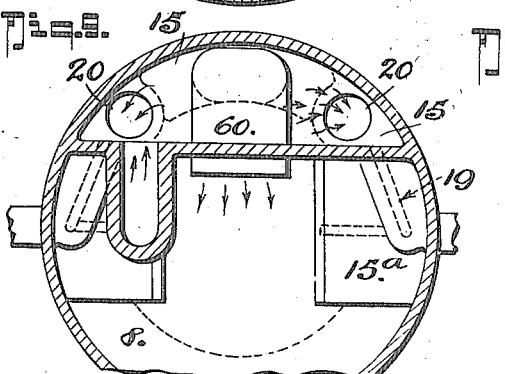
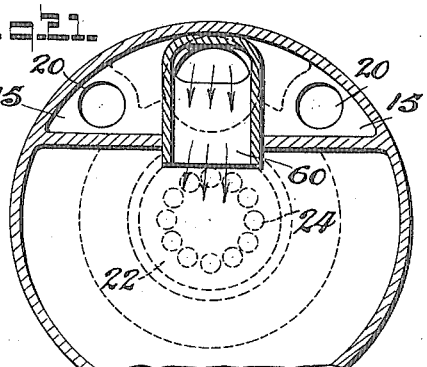
INVENTOR
Thomas May
BY
Fred G. Dieterich
ATTORNEYS

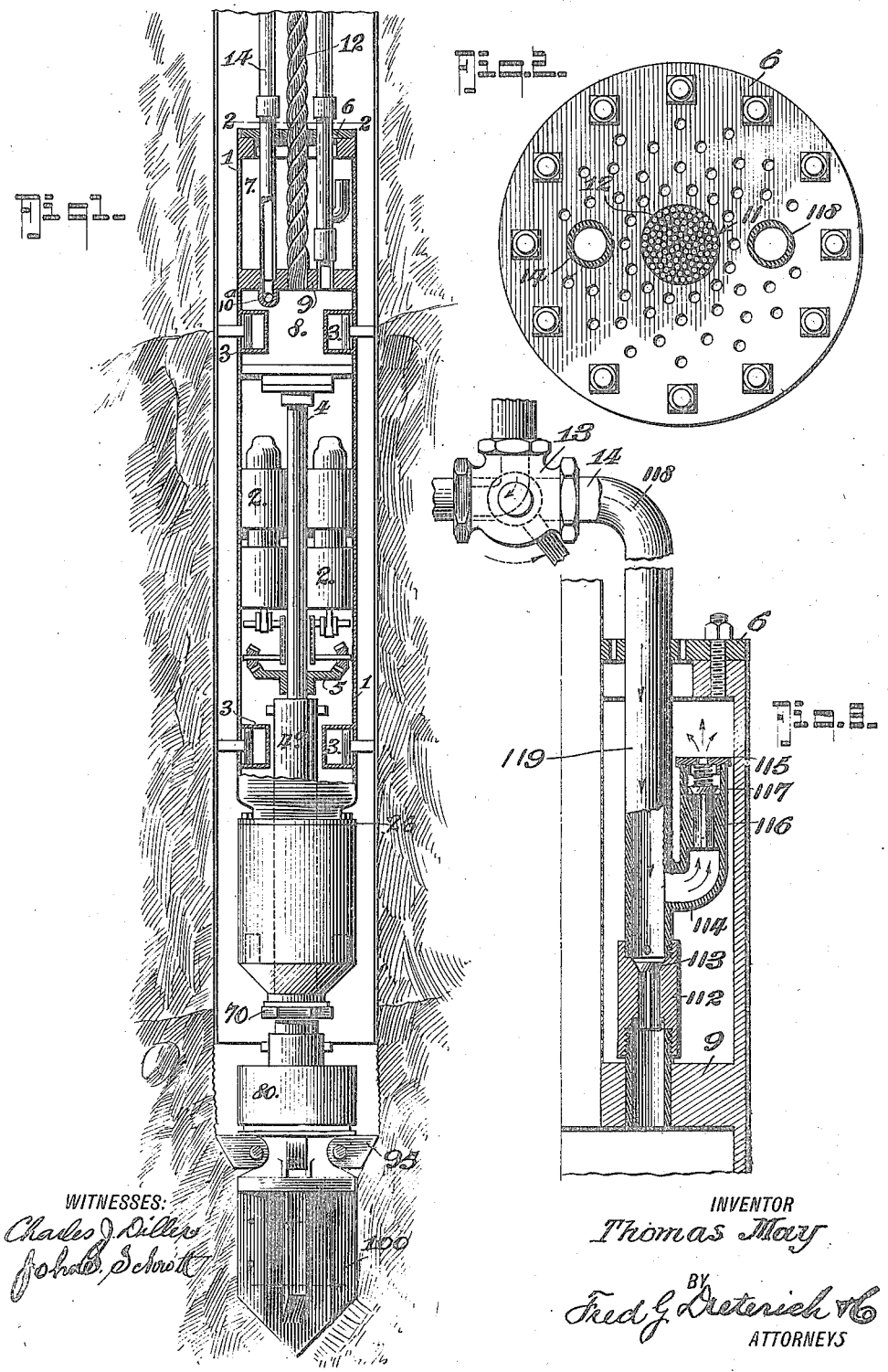

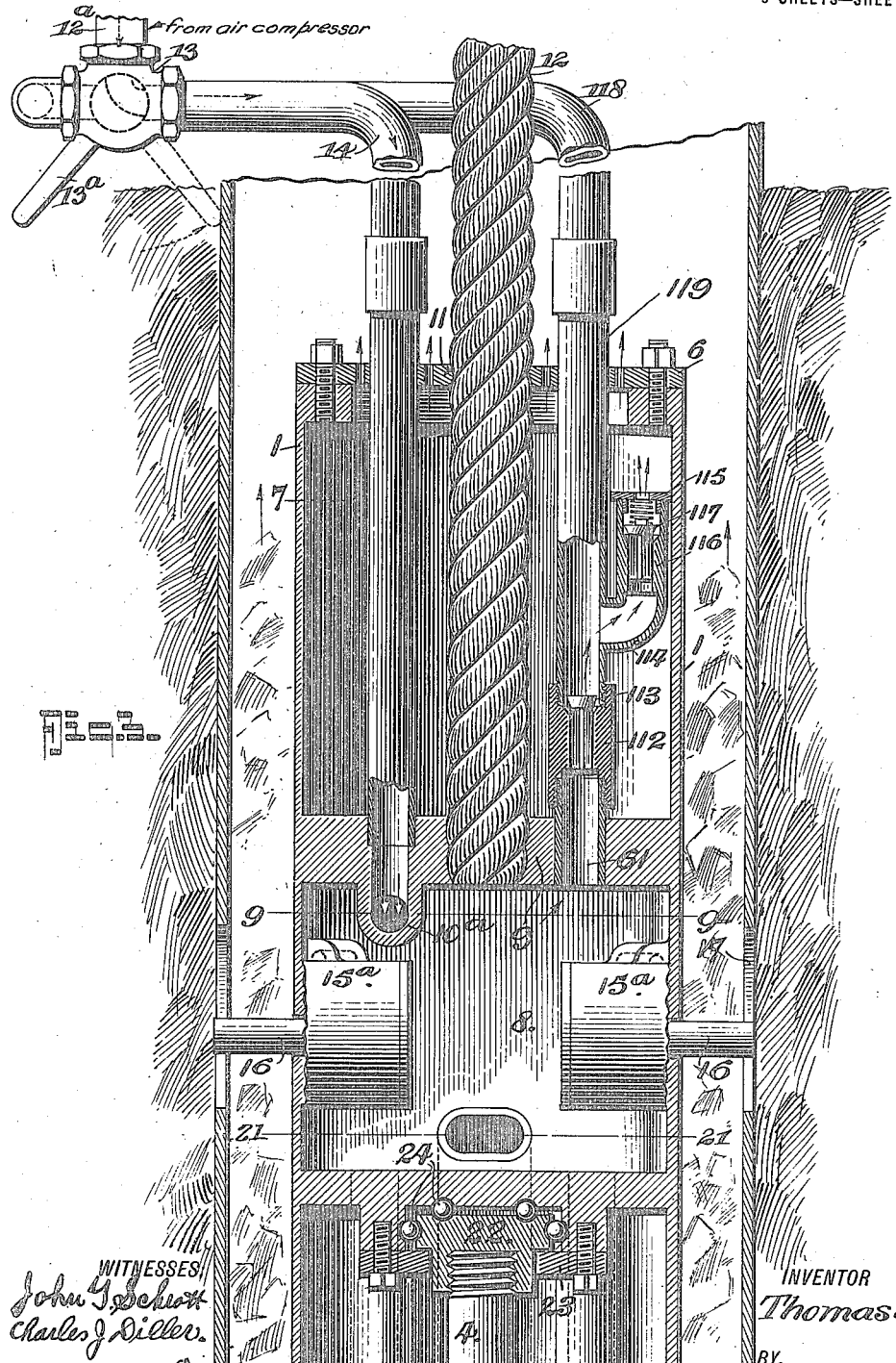

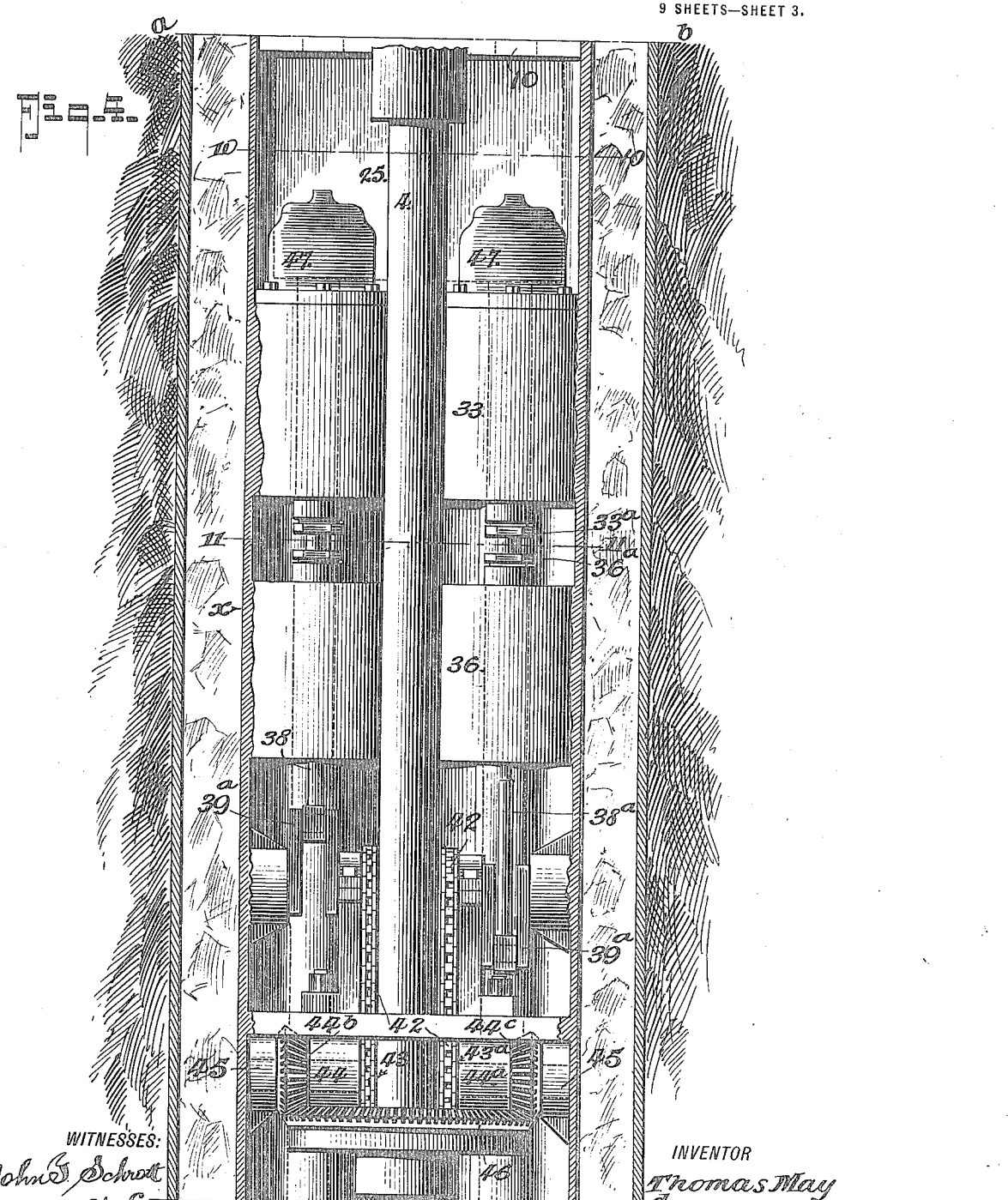

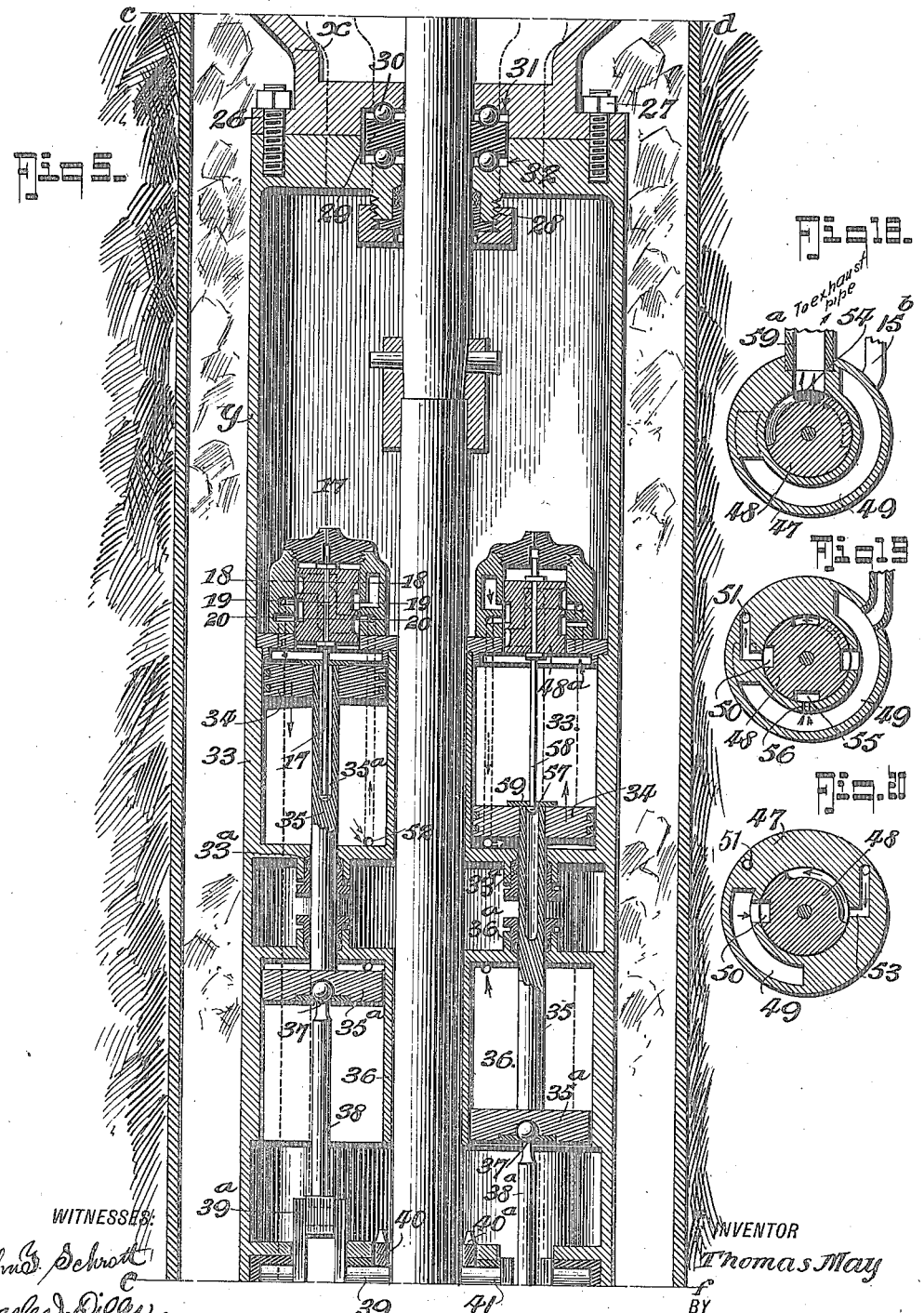

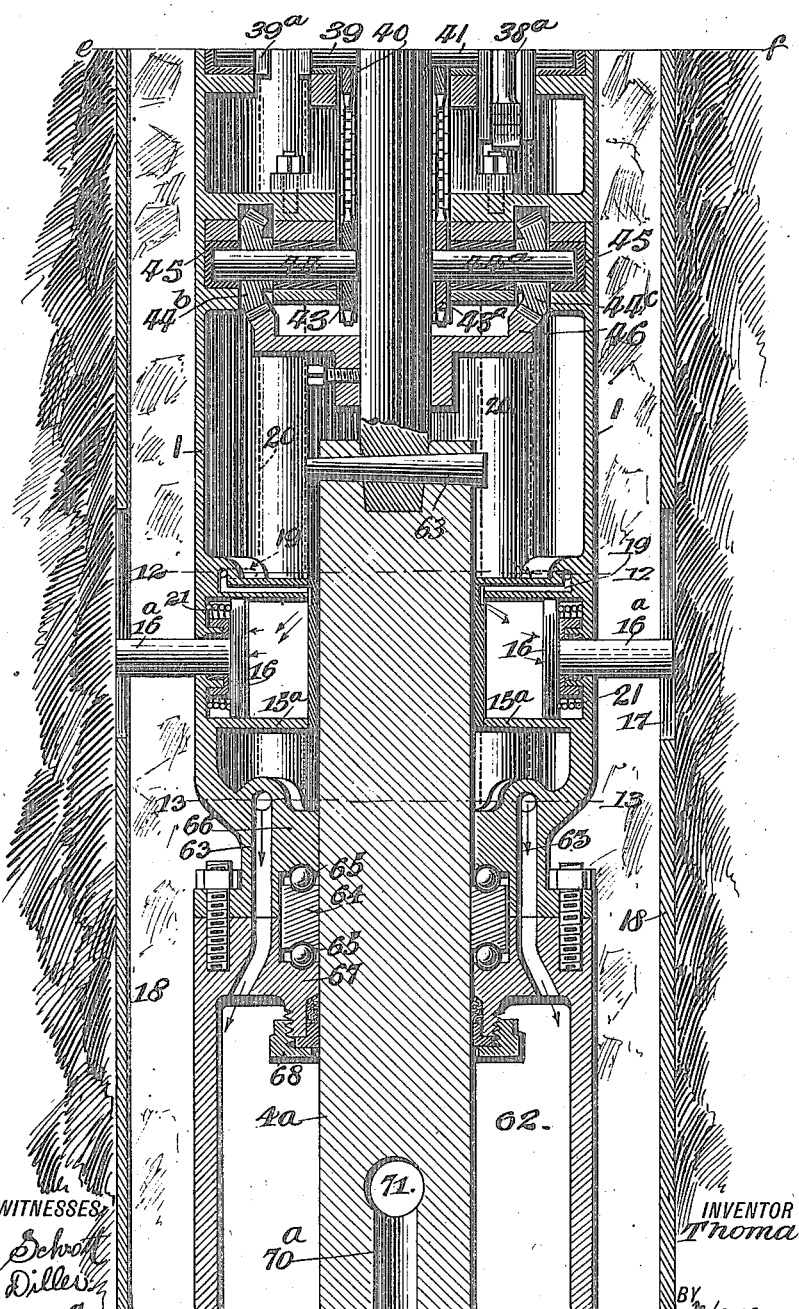

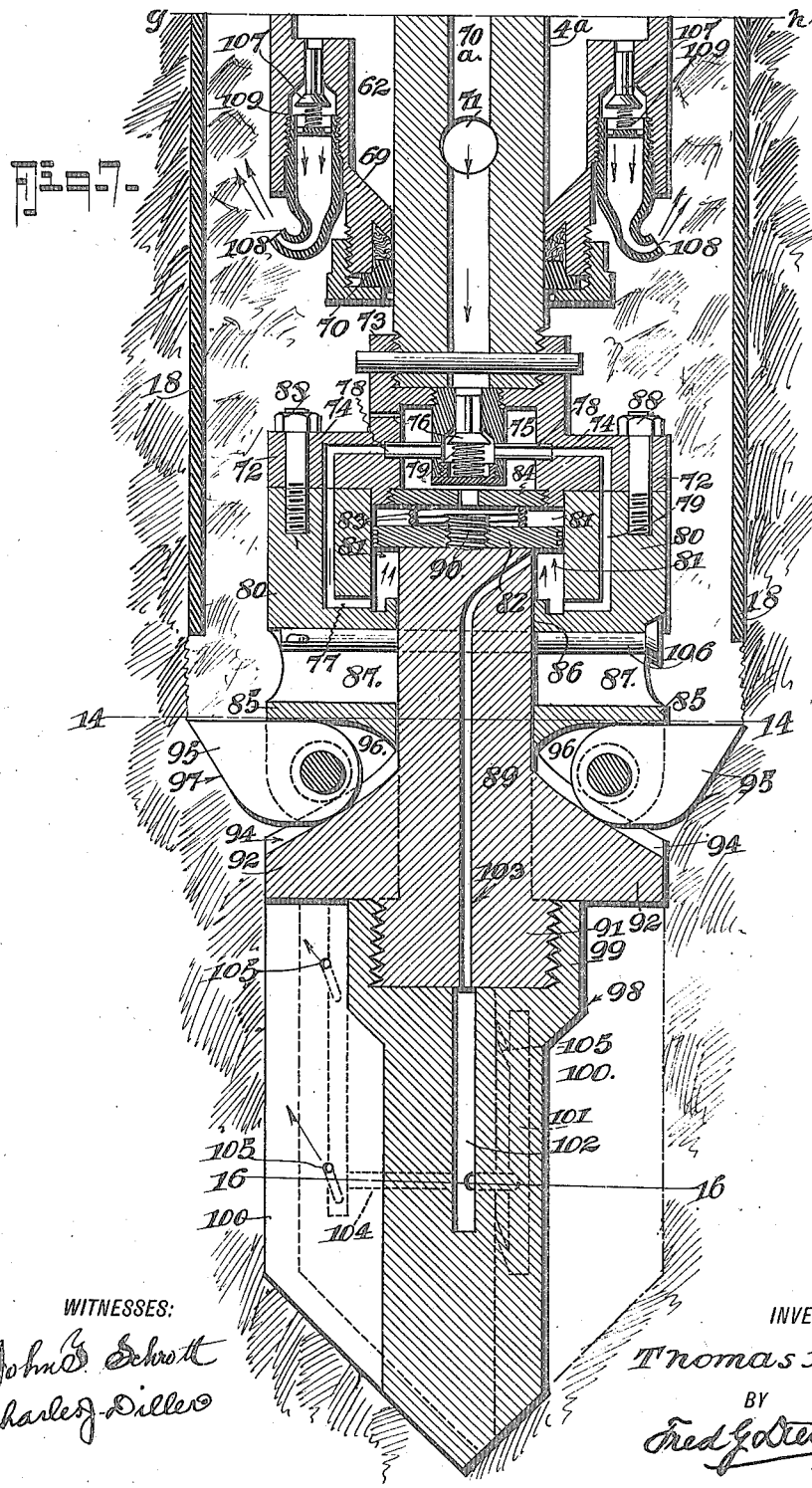

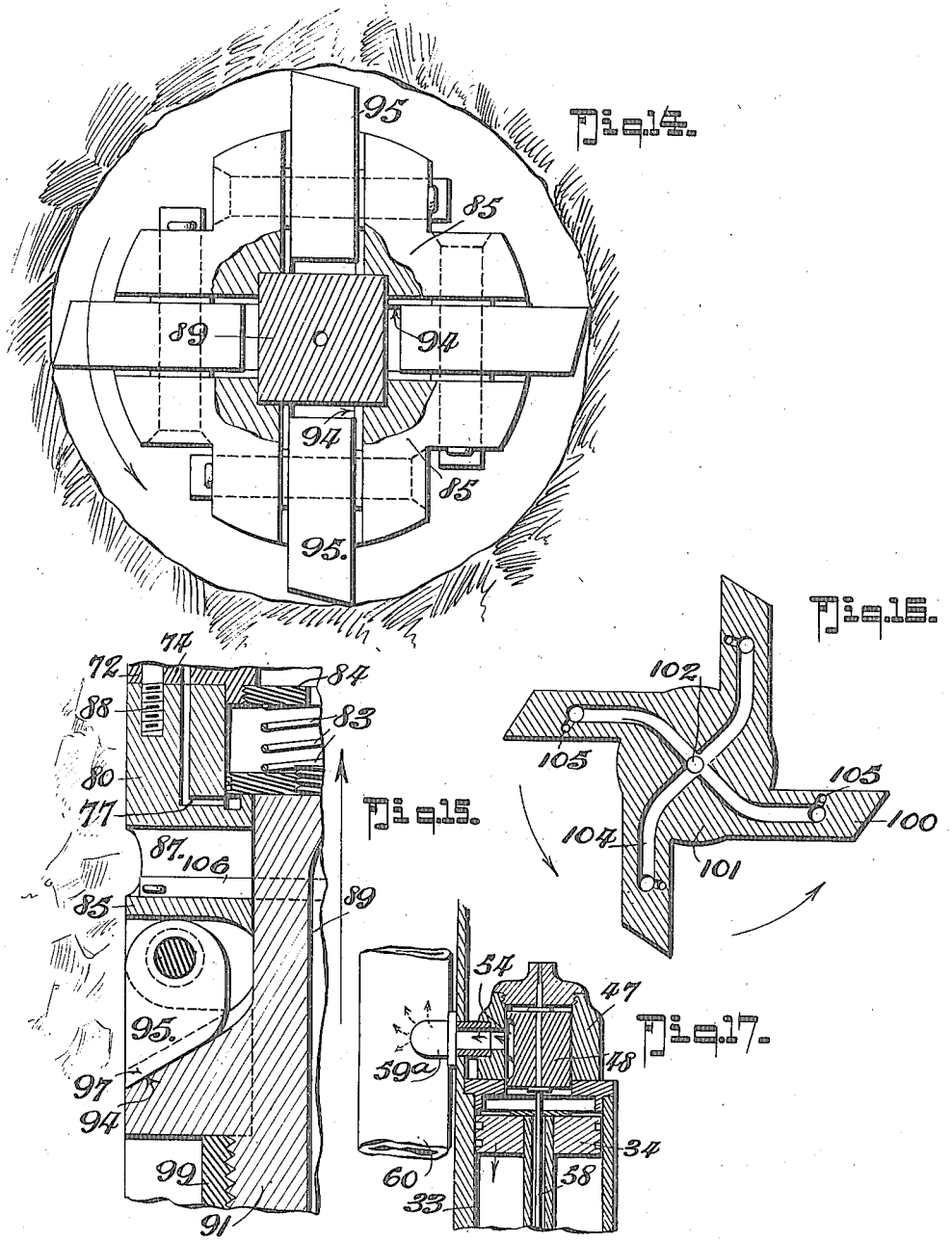

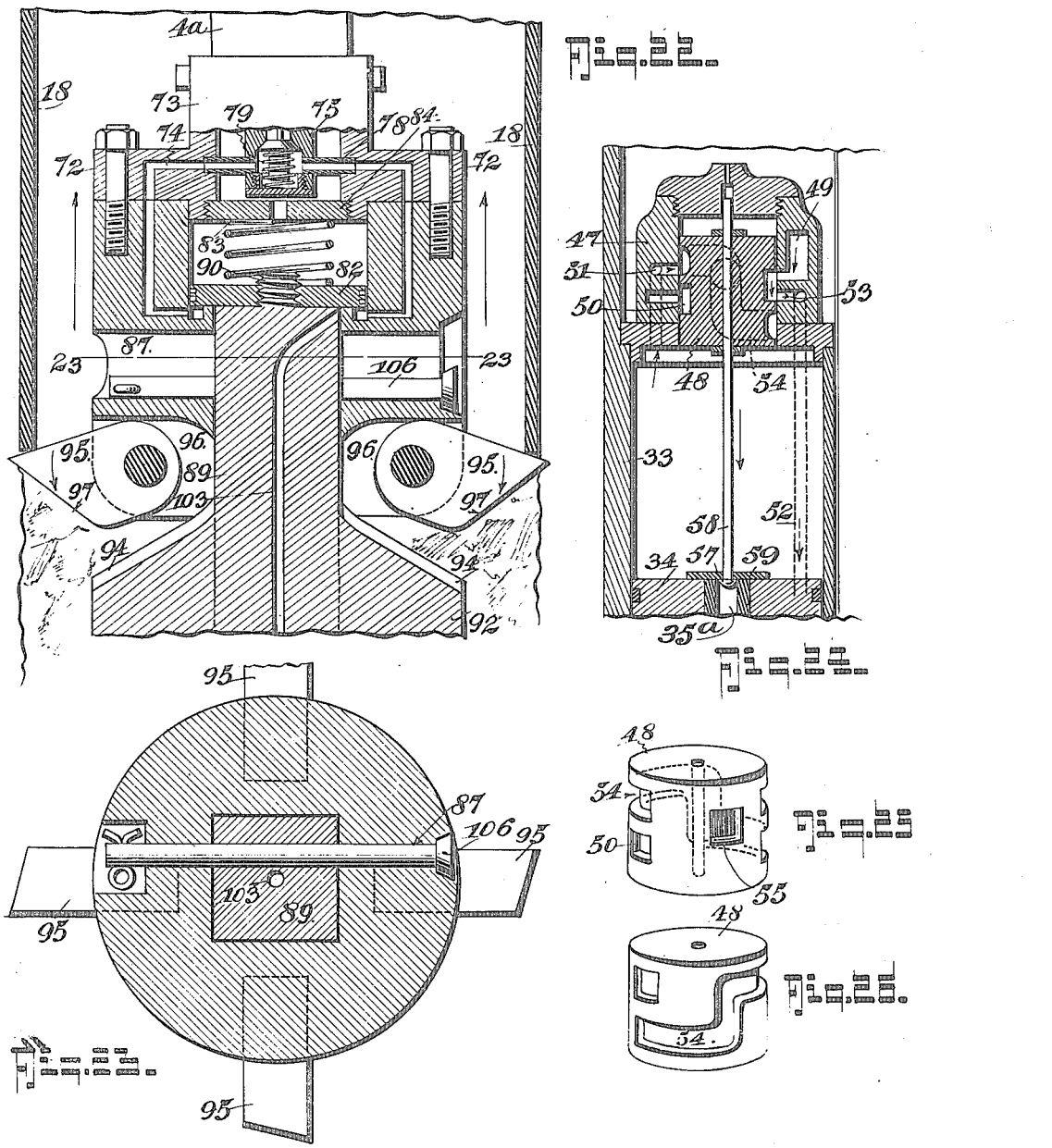

UNITED STATES PATENT OFFICE.

THOMAS MAY, OF CLEBURNE, TEXAS.

WELL-DRILLING MECHANISM.

1,188,001. Specification of Letters Patent. Patented June 20, 1916.

Application filed March 23, 1916. Serial No. 86,128.

*To all whom it may concern:*

Be it known that I, THOMAS MAY, residing at Cleburne, in the county of Johnson and State of Texas, have invented a new and Improved Well-Drilling Mechanism, of which the following is a specification.

This invention, which has reference to deep well drilling mechanisms, primarily has for its object to provide an efficient pneumatically controlled well boring mechanism adapted for being supported from an over-head cable and which lowers, by gravity, as the work progresses.

In its generic nature, my invention comprehends a sinking tube or casing, a drill shaft rotatably mounted within the said tube, and pneumatically operated motor mechanism within the casing supplied from an over-head air compressor, through suitable valve controlled leads that direct the air to the said motor mechanism.

My invention also embodies, in a drilling mechanism of the general character stated, automatically operated means, controlled by the fluid from the over-head air supply for holding the pneumatically actuated motor mechanism and the well sinking tube or casing from turning within the well casing during the drilling operation.
Again, my invention embodies in coöperative combination with an air driven motor mechanism, an improved construction of rotary drill that includes wing-like cutting blades that are projected radially from the drill stock or head to extend beyond the circumference of the well sinking tube or casing, whereby to cut a bore of larger diameter than the well tube to thereby provide for the ready insertion of the well casing sections and for the convenient and expeditious exhausting of the drillings, the said rotary drill construction also including means for preventing the dirt or water entering the sinking tube, and obstructing the drill actuating mechanism.

Another and essential feature of my invention is embodied in an improved means for leading the air, under compression, to the motor mechanisms, to the means for holding the well tube or casing from turning as it lowers with the operating mechanism as the well bore is being deepened, to the drill head for effecting certain adjustments of parts thereof and thence under its maximum pressure or force into the well bore for exhausting the drillings, and cleaning the well.

In its more complete nature, my invention includes an improved means for directing the exhaust fluid from the motor engines, to mix with the air that exhausts the drillings and other means, operable under a valve controlled feed from the air compressor at the top of the well for exhausting the air from the sinking tube through the top of the tube or the top of the well to the atmosphere, when it is desired to lift the said tube and the drilling mechanism from the well bore, or at such times when it may be necessary to effect the air exhausting operation.

In its more subordinate features, my invention consists in the detailed construction and novel arrangement of the parts hereinafter fully explained, specifically pointed out in the appended claims, and illustrated in the accompanying drawings, in which:—

Figure 1 is a diagrammatic section of my invention, illustrating a generic arrangement thereof, one air engine and a complete set of clutch devices and a coöperating rotary drill being shown. Fig. 2 is a horizontal cross section, on an enlarged scale, taken on the line 2—2 on Fig. 1. Figs. 3, 4, 5, 6 and 7 are cross sections of the complete drill mechanism and are to be read as one figure when joined on the intermediate lines a—b—c—d—e—f and g—h. Fig. 8 is a detail cross section of a part of the top of the drill mechanism, showing the three-way cock positioned to direct the air through the exhaust valve as when withdrawing the drill from the well. Fig. 9 is a cross section on the line 9—9 on Fig. 3. Figs. 10 and 11 are detail cross sections on the lines 10—10 and 11—11 respectively on Fig. 4. Figs. 12 and 13 are detail cross sections on the lines 12—12 and 13—13 on Fig. 6. Fig. 14 is a cross section on line 14—14 on Fig. 7. Fig. 15 is a detail cross section of a part of the lower end of the drill stock and shows the lateral or wing-like bits retracted as when with-drawing the mechanism from the well. Fig. 16 is a cross section on the line 16—16 on Fig. 7. Fig. 17 is a vertical section on the line 17—17 on Fig. 5. Figs. 18, 19 and 20 are cross sections on the lines 18—18, 19—19 and 20—20 respectively, on Fig. 5. Fig. 21 is a cross section on the line 21—21 on Fig. 3. Fig. 22 is a detail section of the lower end of the drill bit stock showing the engagement of the wing bits with the well casing to close the bits, when obstructions prevent them from falling into position. Fig. 23 is a cross section on the line 23—23 on Fig. 22. Fig. 24 is a detail section of one of the air cylinder valve mechanisms. Figs. 25 and 26 are detail perspective views of the shiftable valve members, viewed from opposite sides.

Briefly outlined, my improved pneumatic rotary well drilling means embodies a sinking tube or casing that follows down in the well opening formed by an advancing rotary drill, a cable suspension gradually fed out to allow the sinking tube with the attached drilling mechanism, to gravitate into the well bore, a rotary drill shaft mounted within the sinking tube, a drill head pendently supported on the lower end of the shaft and having cutting blades or wings that ream out the opening made by the drill to a diameter larger than the sinking tube.

Pneumatically operated clutch devices located at the upper and lower end of the sinking tube for interlocking with the well casing are also provided, for holding the motor driven mechanisms and the sinking tube in proper position for rotating the drill carrying shaft.

Air is supplied to the motor engine or engines that actuate the rotary drill, from an air compressor suitably located above the well, controlling valve devices in the pipe line being provided, which, under proper adjustments, provide for leading air to the drill actuating mechanism and through certain exhaust passages when the drill mechanism is to be drawn from the well.

The air is led to a reservoir in the sinking tube directly above each of a plurality of air operated engines. The air is also led from the said reservoirs through suitable ducts, cast, into or otherwise formed on the drill casing, to the air engine valve chambers, and also continues downwardly until it is finally exhausted through blowing nozzles or ducts in the rotary drill head or stock, and when thus ejected it acts as the means for clearing the well bore.

The exhaust air from the cylinders does not pass out through the bottom of the drill bit as the live air does, but is led through pipes or other conducting means that preferably pass up through the air reservoir in the sinking tube and lead to atmosphere.

In Fig. 1, I have shown the simplest form of my invention and in the said form the sinking tube 1 is shown as a single section, and but one motor engine 2 and power transmission mechanism coupled with the rotary drill shaft is shown, clutch devices 3—3 located at the top and bottom of the tube 1, and in the said showing the main portion of the rotary drill shaft is also shown as being formed of a single member.

For digging wells of considerable depth, I make the sinking tube and the rotary drill shaft 4 of sections and provide each section with a motor engine and coöperating power transmission, that couples with driven gears 5 on the several respective shaft sections and I deem it proper to also state that another reason for forming the sinking tube 1 and the drill shaft in sections is, that the space in which to place the motor cylinders is not, in practice, sufficient for using cylinders of more than two inches in diameter and hence in order to get the desired air cylinder area required for obtaining the desired power and rotary speed for the drill shaft, the said parts are made of sections, as stated. In the drawings, Figs. 3, 4, 5, 6, and 7, the structure includes two complete sets of motor engine and power transmission mechanisms, all of which are timed to operate in unison for transmitting a steady rotary motion to the drill shaft, it being understood that by making my improved drill mechanism in sections, as stated, if the mechanism in one section is broken or otherwise disabled, it may be readily removed and new mechanism substituted without impairing other parts of the drill.

Referring now to the details of structure, 1 designates the upper section of the sinking tube or casing, the upper end of which is in the nature of a perforated top or cap plate 6, and the said section is divided into an upper compartment 7, and a lower compartment 8, by partition 9, as is best shown in Fig. 3, by reference to which it will be seen the perforated top plate 6 has a central opening 11, through which the supporting cable 12 passes and whose lower end is made fast to the bridge member 9.

12$^a$ designates a pipe line which, in practice, connects with an air compressor, and joins with a three-way cock 13 adapted, when the handle 13$^a$ is turned to the full line position for directing the live air into a flexible or hose line 14 that passes down through the cap plate 6, through the chamber 7 and into port 10$^a$ formed on the under side of the bridge member 9, and which discharges into a main air reservoir 15 formed at one side of the tube 1 (see Fig. 9) and which extends the full height of the compartment 8.

As before stated, the operating mechanism is held from turning as it gravitates down into the well bore and for such purpose I have provided four clutch devices each pneumatically controlled, two of such clutches being located in the compartment 8 and two in the lowermost section of tube 1.

The several clutch valves are of like construction, one set of such valves being shown in detail in Fig. 6, and each of such valve devices comprises a cylinder 15$^a$, in which is contained a plunger piston 16 that includes a bolt 16ª projected through the tube 1 and adapted for being projected into a slot or groove 17, cut lengthwise in the well casing 18.

Each clutch cylinder has an air duct 19 that leads live air against the piston 16 and each duct 19 communicates with an air lead 20 on the inside of the tube that opens into the main air reservoir 15 and by reason thereof, so long as air under pressure is in reservoir 15 the pistons 16 are held out to the clutching position shown in Figs. 3 and 6, but when the air in the reservoir 15 is exhausted, as hereinafter explained, springs 21 force the pistons 16 back to disconnect the piston or clutch bolts 16ª from the casing and thereby allow for readily lifting the entire mechanism out of the well casing.

The upper end of the upper section of the drill rod 4 is suitably mounted in a thrust bearing that includes a screw tapped member 22 held up by a clamp ring 23, and engaging ball bearings 24, (see Fig. 3).

25 designates a chamber in the sinking tube 1 between the partition or bridge member 10 and the bottom 26 of the tube section x, the said bottom 26 being coupled with the upper end of the next tube section Y (see Fig. 5) by the bolts 27, and provided with a gland 28, and a thrust member 29 on the shaft that rides on ball bearings 30, located in the opposing seats 31—32 in the sections x—y.

Within the chamber 25 is located a set, two being shown, of air driven engines, the detailed construction of which is best shown in Figs. 5, 18, 19 and 20, Fig. 5 showing the said engines in cross section.

The motor engine mechanisms are preferably constructed in the manner shown, since such construction provides a simple, compact, and effective means for transmitting power and speed to the rotary drill shaft, and while I prefer to use a motor mechanism such as is illustrated in detail in Fig. 5, and presently fully described, I desire it understood that I do not limit myself to the special engine structure referred to, since other types of air driven engines may be employed for driving the rotary drill shaft.

As the several motor engines in the complete construction of my well drilling mechanism are constructed and operate alike, a detailed description of one of such engines will apply for all, it being readily understood that all of the engines operate in proper unison for imparting the desired rotation to the drill shaft to avoid torsional or twist strain on the said shaft, and it should be stated that each pair or set of engines (see Fig. 5) have alternate piston strokes, that is, the piston in one engine moves up while the other moves down, both under compressed or live air impetus.

Each engine comprises a working cylinder 33, and a working piston that includes a rod 35, a head 34 on the upper end of the rod that travels in the cylinder 33 and a guide head 35ª that travels in the open end of the trunk cylinder 36, it being understood that the cylinders 33 and 36 are cast or otherwise made fast with the sinking tube 1.

Each cylinder 33—36 has a gland 33ª—36ª for the rod 35, and the lower or guide head 35ª, has a ball and socket connection 37 for the link rod 38 that joins with the crank 39ª of a shaft 39, suitably mounted within the tube 1, and which carries a sprocket gear 40, it being understood that shaft 39 is in alinement with a mate shaft 41 having a gear 40ª and a crank for the link rod 38ª that forms a part of the adjacent motor engine mechanism (see Fig. 5).

Motion is transmitted from the crank shafts 39—41 to the drill shaft 4, by endless sprocket chains 42—42 that take over the sprocket gears 40—40ª and like gears 43—43ª on a pair of coöperating shafts 44—44ª journaled in suitable bearings 45 fixedly mounted in the tube 1 that have bevel gears 44ᵇ—44ᶜ and which are in mesh with driven gear 46 on the drill shaft, one of such gears 46 being located on the said drill shaft for connecting the said drill shaft 4 up with each set of motor engines, of which only two are shown in the drawings.

Referring now to Figs. 5 to 18, 19—20—24, which illustrate in detail the motor engine structure; 47 designates a valve casing mounted on the top of the cylinder 33 in which is located a vertically reciprocable valve 48, whose external shape is best shown in Figs. 25 and 26.

Valve casing 47 has an air chamber 49 into which the air is fed through the pipe connection 15ᵇ from the main reservoir 15 and which, when the valve is at the position at the limit of its up stroke as shown at the left of Fig. 5, passes around the valve 48 to a pocket 50 in one side thereof, and from the said pocket into a lead 51, in the casing 47 (see Figs. 5–19) and discharges on top of the working piston 34 and drives such piston on the down stroke, the air under the said piston now exhausting through a bleeding-off port 52 in the cylinder casing that communicates with a cross port 53 that communicates with an exhaust port 54 in the outer face of the valve, as best shown in Fig. 26, and which is common to the said port 53 and the port 51 at the opposite side of the valve, it being understood that ports 53—52 become the leads for conveying the live air to the working piston when it reaches the limit of the down stroke, see position of the companion working piston at the right of Fig. 5, and when the said working piston is impelled upwardly the port 51 becomes an exhausting port. At this point it should be stated that the arrangement of the valve and piston mechanism for the working cylinder of the engine shown at the right of Fig. 1 is reverse that shown for the other or companion engine, to provide for the proper alternate crank actuating operations.

Valve 48, which is intermittently shifted in the manner presently explained, when moved to either of its positions, is held to such positions, during the completion of the piston strokes, by live air pressure against the side thereof, it having a pocket or cavity 55 (see Figs. 19 and 25) to which air is led through a passage 56 in the valve casing in communication with the annular air duct 49.

For shifting the valve 48 at the proper predetermined intervals, piston rod 35 has a vertical socket 35ª whose depth is sufficiently less than the length of the piston stroke to provide for a cap piece 59 on the piston engaging the head 57 at the lower end of the shifting rod 58, when the piston about reaches the limit of its down stroke to cause the said rod 58 to move down with the final down movement of the piston and thereby pull the valve 48 from its upper position shown at the left of Fig. 5 to the lowered position of the valve 48ª in the other working cylinder, it being understood, that as the aforesaid working piston reaches the finish of the up stroke, the base of the socket portion 35ª of the piston rod engages the member 57 and lifts it to position the valve 48 to its uppermost adjustment as shown.

The exhaust air from the working cylinders of each set of engines constituting all of the engines in my complete system, discharges from the exhaust ports 54 into laterals 59ª that communicate with an exhausting pipe or flue 60 (see Fig. 10) that extends up nearly the full length of the sinking tube and discharges into the compartment 8 that connects through a short pipe 61, with a union member 112 in which is mounted a check valve 113 normally lifted to the open position by the exhausting air, which passes up into a discharging member 114 that includes a perforated and removably mounted cap 115 which forms the top of a valve chamber 116 in which is located a valve 117 spring held to its seat and which opens under the exhausting air pressure for the exit of the said exhausting air and suction in the top of tube 1 into the upper end of the sinking tube from which it passes through the perforated top 6 and mixes with the live air that passes up and clears the well hole.

62 designates a supplemental air reservoir suitably attached to the bottom end of the sinking tube 1, which end extends a short distance below the lower set of clutch valves 15ª, as is best shown in Fig. 6, which should be now read with Fig. 7, since these views best illustrate the construction of the drill and the live air conduits that lead the air, under full pressure, through the drill stock or head and into the bore made by the drill for exhausting the well hole of the cuttings, as they are made during the operation of drilling.

It will be seen in Fig. 6, the air ducts or leads 20 from the main air cylinder discharge live air under a full head or pressure, through ports 63—63 in the connecting ends of the lower ends of the sinking tube 1 and the reservoir 62, see Fig. 6, and at this point it should be stated the drill shaft section 4ª is of somewhat greater diameter than the section above it to which it is preferably detachably connected by a lock key 63, and the said shaft section 4ª carries a thrust collar 64, that rides on ball bearings 65 mounted in the opposing sockets 66—67 formed on the connecting ends of the tube 1 and the reservoir 62, a suitable gland 68 on the shaft being formed on the upper end of the reservoir 62, as shown.

The lower end of reservoir 62 tapers to central bearing 69 for the lower end of the shaft section 4ª and is provided with a packing gland 70, as is clearly shown in Fig. 7, by reference to which it will be seen the said lower end of shaft section 4ª is formed with a central bore or air channel 70ª that opens through the laterals 71 into reservoir 62, and extends down through the lower end thereof, the reason for which will presently appear.

The drilling devices proper comprise a head portion or stock 72 that includes an internally threaded hub 73 at the upper end that screws onto the lower externally threaded end of the shaft section 4ª, the said hub forming a part of a head member 74 which has a chamber 75 in which is mounted a check valve 76, which, when live air passes down the hollow drill rod section 4ª, as indicated by arrows on Fig. 7, is held open against its closing spring 79 to provide for the passage of the live air through laterals 78—78 into the ports 77—77 formed in a second head member 80 having an air pocket or chamber 81 into which the ports 70—70 discharge against a piston 82; which when the live air is turned off is forced down to the position shown in Fig. 22 by a stout coiled spring 83 interposed between the said abutment member 84 that screws into the head member 74 and forms a closure for the check valve member 75.

The head member 80 includes a pendent portion 85 that has a central bearing 86 and a vertically elongated cross slot 87 and the said member is secured to the other or upper head member 74 by the bolts 88, as shown.

The drilling devices proper also include a shank member 89, the upper end of which is projected through the central bearing 86 and is formed with a threaded boss 90, to which the piston 82 is attached.

The shank 89, at its lower end, has an externally threaded boss 91 and an enlarged disk-like portion 92 provided with a series, four being shown, of radially disposed downwardly and outwardly inclined grooved trackways 94 adapted for edgewise engaging a series of winged bits or blades 95 pivotally mounted in undercut radially disposed sockets 96 in the under face of the pendent portion 85 of the drill stock or head 80, and adapted, when at their operative position to project laterally from the drill head for the purpose of reaming out the hole, initially made by the drill bit, larger than the diameter of the sinking tube 1 to permit the well casings to follow down as the drill descends to the work.

When the air pressure is not on, the wing blades drop by gravity to the position shown in Fig. 15 with their outer edges flush with the periphery of the drill head or stock and with their beveled or inclined faces 97 seated in the inclined grooved ways 94.

98 designates the drill bit which is of a diameter equal to that of the drill head and the said bit comprises an internally threaded socket 99 that attaches to the boss 91 and the said bit also includes a series, four being shown, of radial blades 100 that project from a hub 101 common to all of the said blades, as is clearly shown in Fig. 16, by reference to which it will be noticed that the hub portion 101 has a central air pocket or channel 102 that communicates with an air port 103 that extends centrally up the shank 89 and opens into and receives the air from chamber 81, the live air that passes down the channel or port 102 escaping into laterals 104 in the several wings of the drill bit that terminate in blow off orifices 105 that project upwardly at an angle of about 90° to eject the escaping live air, under full head upwardly to effectively assist in blowing the drillings up around the sinking tube, in exhausting the bore being made by the descending drill.

106 designates a safety key bolt that passes through the bit shank and through the elongated cross slot 87, (see Fig. 7) and the said bolt is provided for the purpose of preventing the loss of the drill bit and shank should the piston head 82 on top of the shank break or wear off.

107 designates a pair of check valves located in the lower end of the drill air reservoir 62, and the said valves control air ejecting nozzles 108, that direct the live air into the well bore and assist in blowing the borings away from the drill bits. When live air is not on, the valves 107 close under tension of springs 109.

In the manufacture of my well drilling apparatus, the crank boxes are preferably cast solid or otherwise fixedly secured to the sinking tube, the cylinders of the motor engine being also fixedly attached to the casing, as shown.

The drill bit in the construction shown, is mounted for being operated "left hand" (see arrow on Fig. 14).

In the practical arrangement of my drilling apparatus the drill shank is two inches square and about seven inches long, including the wing bit shoulder portion and the threaded boss on the bottom thereof, the said shank, the wing bit shoulder and lifter and the boss on the bottom being cast in one piece (see Fig. 7).

By reason of the peculiar construction of the drill the live air admitted to the lower reservoir 62 in which is contained the hollow shaft section $4^a$, passes into and down through the said shaft section $4^a$ against the check valve 76 and passes by the said valve 76, through the laterals 78 into the ports 77 into the air chamber 81, against the piston 82 and thereby lifts the drill shank and the drill bit a distance sufficient to cause the wing bit lifter shoulders to spread out the wing bits to the position shown in Fig. 7, to thereby ream out the hole made by the drill large enough for the well casing sections to follow on down as the drill descends, it being understood from the foregoing description, and the showing in Fig. 7 that when the live air is shut off, the drill bit shank will, with the drill, drop to the normal position (see Figs. 15 and 22) and if for any reason it fails to do so, the shank, the piston 82 and the drill will be forced down by the spring 83 on top of the piston 82. The wing bits will also fall by gravity the same as the shank when air is shut off,—if they fail to do so, they will be positively forced down when they come into contact with the well casing as the drill mechanism is being extracted from the well bore (see Fig. 22).

The speed of the drill, in practice, is determined by the pressure of the air admitted, it being desirable, in practice, to get from three to five hundred or more revolutions per minute, this depending on the particular character of the work being performed by the drill.

If the drill bit, in practice, was working on rock or hard dirt, all the time, it would not be necessary to lift it by fluid pressure, as stated, since it would be forced upward by the hard substance in which the drill is working, but when working in soft dirt or loose sand the drillings would not be forced upward, hence the utilization of the fluid pressure for effecting such operation.

In the practical operation of my construction of drilling mechanism, the live air pressure is first conveyed to the clutch valve devices that include plunger bolts which, when forced out under the air pressure in their valve cylinders, engage the well casing sections which have either elongated slots or grooves 17 to receive the bolts to permit of relative vertical movement of the casing sections 18 and the bolts. Some of the live air, in its course passes into the working cylinders of the several motor engines, and the fluid pressure utilized for driving the motor engines exhausts through the perforated top of the sinking tube, as hereinbefore stated. The live air, as it continues down through the air ducts 20, passes through the ducts or ports in the drill body for effecting the operation of lifting the drill bit and shank for spreading the wing bits and then exhausts from the said drill body, under full pressure into the bore being drilled and rises with the drillings up through the well bore around the sinking tube, to atmosphere.

For exhausting the air in the several air reservoirs located within the sinking tube, when it is desired to cut off the operation of drilling or to provide for freely lifting the drilling apparatus out of the bore made the three-way valve in the air lead at the top of the well is turned to the dotted position (Fig. 3) which cuts the working fluid from the flexible feed pipe 14 and leads it into a supplemental flexible air feed pipe 118 which connects with a pipe section 119 that joins with the union 112 and the exhausting member 114, as is shown in Figs. 3 and 8.

By reason of connecting the exhausting pipe section 119 in the manner stated, it follows that when the main air feed is shifted into the pipe 118, as stated, it closes the valve 113 and thereby provides for the escape of the live air through the perforated top or head of the tube as the drill is being extracted from the well and the said main live air pressure cleans the well as the drilling mechanism is lifted out of the well.

While I have specifically shown and described my pneumatic rotary drill as designed for well digging, it can be readily adapted for use in sinking casings in river beds for concrete piers and in many other places where casings are to be set for piers. It may be also so modified in its details to adapt it for use for boring post holes for telephone and telegraph systems.

The detailed construction of parts shown and described illustrates a practical arrangement of my invention, but I desire it understood that I do not limit myself to the exact structural arrangement of the parts illustrated, since they may be readily modified and changed to suit the particular character of the work to be done without departing from my invention, as defined in the appended claims.

Among other advantages is should be stated in my construction, the operation of drilling is practically automatic, since so long as the air pressure is on at the top of the well, the drill mechanism follows down to the work, as fast as the bore is being made, and drillings are exhausted through the top of the well as made.

What I claim is:

1. A supporting cable, a drilling mechanism suspended thereby, said drilling mechanism including a sinking tube having an air reservoir, a rotary drill, an air motor for driving the drill, means for conveying operating air to the reservoir, air leads from the reservoir to the air motor, and other means for delivering scavenging air from the said reservoir.

2. A supporting cable, a well casing, a drilling mechanism suspended from the cable and adapted to gravitate through the well casing, said well mechanism including a rotary drill having a bit located in advance of the casing, an air motor for driving the drill, pneumatically operated clutch devices carried on the drill mechanism for engaging the well casing to hold the said drill mechanism from turning within the casing, and means for conveying operating air from the surface to the air motor and the clutch devices.

3. A supporting cable, a well casing, a drilling mechanism suspended from the cable and longitudinally movable in the casing, pneumatically operated means for holding the drilling mechanism from turning within the casing, said drilling mechanism including a rotary drill head and a drill bit, wing bits on the drill head adapted to be laterally projected to ream out the hole made by the drill bit, pneumatically actuated means for lifting the drill bit relatively to the drill head, said drill bit having engagement with the wing bits and adapted when lifted to sustain the said wing bits, an air motor for driving the drill mechanism, and means for conveying operating air from the surface to the air motor and the pneumatically actuated means for lifting the drill bit.

4. In a deep well drilling apparatus, a well sinking tube, a drill head and bit in advance of the tube, the said drill head having discharging passages, an air reservoir in communication with the said discharging passages, a rotary shaft mounted within the tube and adapted to rotate the bit head and bit, a pneumatically operated motor engine mounted on the tube for driving the said shaft and means for conveying operating air to the engine and to the aforesaid reservoir as the tube follows down into the well bore whereby to operate the engine and exhaust the well bore of the drillings.

5. In a deep well drilling mechanism, the combination with an over-head cable supported sinking tube, a fluid actuated motor mounted thereon, means for conveying operating air in communication with the motor, a rotary drilling bit and shaft therefor carried by the tube, power transmission gears that join the motor and the shaft, and means for directing the air exhaust from the motor through the top of the well.

6. In a well drilling mechanism of the character described, the combination of a sinking tube and a fluid operated motor contained thereon, means for conveying operating air to a drilling device that includes a rotary shaft within the tube geared up with the motor, and a bit head located in advance of the lower end of the tube, and means for directing some of the fluid pressure ino the well bore for blowing out the cuttings.

7. In a well drilling mechanism of the character described, the combination of a sinking tube and a fluid operated motor contained thereon, a drilling device that includes a rotary shaft within the tube geared up with the motor, and a bit head located in advance of the lower end of the tube, said bit head including radially extensible wing bits adapted to ream out the bore made by the drill bit to a diameter larger than the sinking tube, means for directing some of the fluid pressure into the well bore for blowing out the cuttings, said means including an air reservoir within the tube, air passages through the bit head and ducts that connect the air passages in the bit head and the air reservoir in the tube.

8. In a deep well drilling mechanism, a cable suspended sinking tube within the casing, a plurality of air motors within the tube, a rotary drilling head having a bit end, pendent from the tube, a rotary shaft within the tube connected with the said head, independent power transmission for each motor that gears up with the shaft, an air reservoir on the tube, means for conveying operating air from the surface to the air reservoir, air ducts from the reservoir to the motors, and an exhaust common to all of the motors that discharges through the top of the well sinking tube.

9. In a deep well drilling mechanism, a cable suspended sinking tube within the casing, a plurality of air motors within the tube, a rotary drilling head having a bit end pendent from the tube, a rotary shaft within the tube connected with the said head, independent power transmission for each motor that gears up with the shaft, an air reservoir on the tube, means for conveying operating air from the surface to the air reservoir, air ducts from the reservoir to the motors, an exhaust common to all of the motors that discharges through the top of the well sinking tube, and means for directing some of the operating air to exhaust the drillings through the top of the well bore.

10. In a deep well drilling mechanism, the combination with the well casing, a cable suspended sinking tube within the casing, a plurality of air motors within the tube, a rotary drilling head having a bit end pendent from the tube, a rotary shaft within the tube connected with the said head, independent power transmission for each motor that gears up with the shaft, an air reservoir on the tube, means for conveying operating air from the surface to the air reservoir, air ducts from the reservoir to the motors, an exhaust common to all of the motors that discharges through the top of the well sinking tube, and pneumatically controlled clutch devices on the tube for locking said tube from turning in the well casing as the tube follows down in the casing during the operation of drilling.

11. In a deep well drilling mechanism of the character described; the combination with a cable suspended sinking tube, a motor within the tube, a rotary drill that includes a bit located in advance of the tube and a driving shaft rotatably mounted on the tube and in gear with the motor, means for conveying operating air from the surface to the motor, the said drill head also including two sections one of which is movable relatively to the other, wing bits on the stationary sections that are laterally projectable from the said sections to ream out the bore made by the drill bit, the movable drill head section having means for engaging the wing bits to move them to the lateral or operative position.

12. In a deep well drilling mechanism of the character described; the combination with a cable suspended sinking tube, a motor contained within the tube, a rotary drill that includes a bit located in advance of the tube and a driving shaft rotatably mounted on the tube and in gear with the motor, means for conveying operating air from the surface to the motor, the said drill head also including two sections one of which is movable relatively to the other, two wing bits on the stationary section that are laterally projectable from the said section to ream out the bore made by the drill bit, the movable drill head section having means for engaging the wing bits to move them to the lateral or operative position, and a pneumatically actuated means in communication with the means for conveying operating air from the surface for shifting the movable drill head section to cause it to engage, spread and hold the wing bits to their lateral or operative position.

13. In a deep well drilling means of the character described; a well sinking tube, an over-head suspension therefor, a rotary drill carried on the tube and including a bit in advance of the lower end of the tube, a rotary shaft within the tube, a fluid operated motor located in the tube, means for leading the fluid energy therefrom to the motor, the drill having air ducts in connection with the source of fluid energy, means on the tube that directs the exhaust from the motor through the top of the tube, the said ducts in the drill head being extended upwardly at an angle of approximately ninety degrees.

14. A supporting cable, a drilling mechanism suspended thereby, and adapted to gravitate to the work, the said drilling mechanism including a sinking tube composed of a plurality of sections, a rotary drill shaft within the tube formed of sections, one shaft section for each tube section, a drill head on the lower end of the shaft located in advance of the lower end of the sinking tube, an air reservoir located between the drill head and the lower end of the tube, an air reservoir in the upper end of the tube, an air motor for each tube section, power transmission connecting each motor with its respective shaft section, means for conveying operating air from the surfaces to the two aforesaid air reservoirs, the drill head having passages for ejecting the air for exhausting drillings from the well bore, and means connecting the motors with the air reservoir in the tube, and other means for connecting the air passages in the drill head with the air reservoir below the tube.

15. A supporting cable, a drilling mechanism suspended thereby, said drilling mechanism including a sinking tube having an air reservoir, an air reservoir pendent from the lower end of the said tube, a rotary shaft located in the tube and projected through the lower air reservoir, a drill head secured on the lower end of the shaft, said head having air passages that open into the bore made by the drill, air ducts in that portion of the shaft that passes through the lower reservoir, and which communicate with the air ducts in the drill head, an air motor and power mechanism that connects the motor and the rotary drill shaft, means for conveying operating air from the surface to the air reservoir in the tube and to the air reservoir at the lower end of the tube, and air leads from the air reservoir in the tube to the motor, and means for conveying the exhaust from the air motors up through the sinking tube.

16. A supporting cable, a drilling mechanism suspended thereby, said drilling mechanism including a sinking tube having an air reservoir, an air reservoir pendent from the lower end of the said tube, a rotary shaft located in the tube and projected through the lower air reservoir, a drill head secured on the lower end of the shaft, said head having air passages that open into the bore made by the drill, air ducts in that portion of the shaft that passes through the lower reservoir, and which communicate with the air ducts in the drill head, an air motor and power mechanism that connects the motor and the rotary drill shaft, means for conveying operating air from the surface to the air reservoir in the tube and to the air reservoir at the lower end of the tube, and air leads from the air reservoir in the tube to the motor, means for conveying the exhaust from the air motors up through the sinking tube, and further means for exhausting the operating air from the drilling mechanism and for directing the said operating air into the well bore above the drilling mechanism as the said drilling mechanism is being lifted out of the well for cleansing the said well bore.

17. A supporting cable, a drilling mechanism suspended thereby and adapted to gravitate to the work, said drilling mechanism including a sinking tube having an air reservoir, an air motor on the tube for driving the drill, an exhausting duct in connection with the reservoir, an air inlet duct to the motor and a supplemental air inlet duct in communication with the aforesaid exhausting duct, a back check valve in the said duct, the said exhausting duct including an air inlet and an air outlet, a spring closed valve in the said outlet, and a three-way valve connection that joins the source of operating air to the supplemental air inlet that is connected with the exhausting duct from the motor.

THOMAS MAY.